(12) United States Patent
Bingham

(10) Patent No.: US 10,798,123 B2
(45) Date of Patent: Oct. 6, 2020

(54) MALWARE DETECTION AND PREVENTION SYSTEM

(71) Applicant: Level 3 Communications, LLC, Broomfield, CO (US)

(72) Inventor: Skyler J. Bingham, Superior, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 16/543,284

(22) Filed: Aug. 16, 2019

(65) Prior Publication Data

US 2019/0372997 A1 Dec. 5, 2019

Related U.S. Application Data

(63) Continuation of application No. 16/259,164, filed on Jan. 28, 2019, now Pat. No. 10,389,750, which is a
(Continued)

(51) Int. Cl.
*G06F 21/55* (2013.01)
*H04L 29/06* (2006.01)
(Continued)

(52) U.S. Cl.
CPC .......... *H04L 63/145* (2013.01); *G06F 16/954* (2019.01); *G06F 21/566* (2013.01);
(Continued)

(58) Field of Classification Search
CPC ............. H04L 63/1491; H04L 63/1441; H04L 63/1416; H04L 63/14; H04L 63/1425; H04L 63/1408; G06F 21/566; G06F 21/53
(Continued)

(56) References Cited

U.S. PATENT DOCUMENTS 8,516,590 B1 * 8/2013 Ranadive ............ H04L 63/1483
726/24
8,555,391 B1 * 10/2013 Demir ..................... H04L 67/02
726/24
(Continued)

OTHER PUBLICATIONS

International Preliminary Report on Patentability, dated Feb. 12, 2019, Int'l Appl. No. PCT/US17/017233, Int'l Filing Date Feb. 9, 2017; 6 pgs.
(Continued)

*Primary Examiner* — Haresh N Patel

(57) ABSTRACT

Aspects of the present disclosure involve systems and methods computing devices to access a public network posing as a user to the network to detect one or more malware programs available for downloading through the network. More particularly, a malware detection control system utilizes a browser executed on a computing device to access a public network, such as the Internet. Through the browser, sites or nodes of the public network are accessed by the control system with the interactions with the sites of the public network designed to mimic or approximate a human user of the browser. More particularly, the control system may apply the one or more personality profiles to the browser of the computing device to access and interact with the nodes of the public network. Further, the control system may monitor the information retrieved from the network sites to detect the presence of malware within the nodes.

20 Claims, 5 Drawing Sheets

Related U.S. Application Data continuation of application No. 15/429,005, filed on Feb. 9, 2017, now Pat. No. 10,193,921.

(60) Provisional application No. 62/374,521, filed on Aug. 12, 2016.

(51) Int. Cl.

| | | |
|---|---|---|
| *G06F 16/954* | (2019.01) | |
| *H04L 29/08* | (2006.01) | |
| *G06F 21/56* | (2013.01) | |

(52) U.S. Cl.
CPC ........ *H04L 63/102* (2013.01); *H04L 63/1416* (2013.01); *H04L 63/1425* (2013.01); *H04L 67/30* (2013.01); *H04L 67/306* (2013.01); *G06F 2221/2123* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 8,832,832 B1* | 9/2014 | Visbal | ................... | H04L 63/101 726/22 |
| 8,863,288 B1* | 10/2014 | Savage | ................. | G06F 21/567 726/24 |
| 2007/0072678 A1* | 3/2007 | Dagres | ................... | G07F 17/32 463/42 |
| 2008/0010683 A1 | 1/2008 | Baddour | | |
| 2010/0122343 A1* | 5/2010 | Ghosh | .................... | G06F 21/53 726/23 |
| 2013/0145465 A1 | 6/2013 | Wang | | |
| 2015/0170197 A1* | 6/2015 | Smith | ................... | H04L 9/008 705/14.41 |
| 2015/0264059 A1 | 9/2015 | Stavrou | | |
| 2016/0005029 A1 | 1/2016 | Ivey et al. | | |
| 2016/0050185 A1* | 2/2016 | Wilson | ................ | H04L 63/0428 713/168 |
| 2016/0050188 A1* | 2/2016 | Wilson | ................ | H04L 63/0428 713/171 |
| 2016/0180090 A1* | 6/2016 | Dalcher | ................ | G06F 21/554 726/23 |
| 2016/0182551 A1* | 6/2016 | Kolbly | ................ | H04L 63/1425 726/23 |
| 2016/0188880 A1* | 6/2016 | Smith | ................... | H04L 63/145 726/23 |
| 2016/0191554 A1* | 6/2016 | Kaminsky | ................ | G06F 21/31 726/23 |
| 2016/0191558 A1* | 6/2016 | Davison | ............. | H04L 63/0471 713/171 |
| 2016/0203317 A1* | 7/2016 | Vipat | .................. | G06F 11/3093 726/23 |
| 2016/0378979 A1* | 12/2016 | Kapoor | ................... | G06F 21/85 726/23 |
| 2017/0289191 A1 | 10/2017 | Thioux | | |
| 2018/0027016 A1* | 1/2018 | Touboul | ................. | G06F 21/56 726/23 |
| 2018/0048656 A1 | 2/2018 | Bingham | | |
| 2019/0158511 A1 | 5/2019 | Bingham | | |

OTHER PUBLICATIONS

International Search Report dated Apr. 27, 2017, Int'l. Appl. No. PCT/US17/017233, Intl'Filing Date Feb. 9, 2017; 3 pgs.

Written Opinion of the International Searching Authority dated Apr. 27, 2017, Int'l. Appl. No. PCT/US17/017233, Int'l Filing Date Feb. 9, 2017; 4 pgs.

Cova, Marco et al., "Detection and Analysis of Drive-by-Download Attacks and Malicious JavaScript Code", http://www.site.uottawa.ca/-nelkadri/CSI5389/Papers/40-Cova_et_al_WWW2010.pdf Apr. 2010 , pp. 281-290.

* cited by examiner

MALWARE DETECTION AND PREVENTION SYSTEM

CROSS-REFERENCE TO RELATED APPLICATIONS

This application is a continuation of and claims the benefit of priority from U.S. patent application Ser. No. 16/259,164, filed Jan. 28, 2019, now U.S. Pat. No. 10,389,750, which is a continuation of U.S. patent application Ser. No. 15/429,005, filed Feb. 9, 2017, now U.S. Pat. No. 10,193,921, which claims priority under 35 U.S.C. § 119(e) from U.S. Provisional Patent Application No. 62/374,521, filed Aug. 12, 2016, titled "MALWARE DETECTION AND PREVENTION SYSTEM," the entire contents of each of which are fully incorporated herein by reference.

TECHNICAL FIELD

Aspects of the present disclosure generally relate to computing networks, and more particularly to a system and method for utilizing computing devices to detect potential malware and other harmful software packages received over a public network.

BACKGROUND

Malware, or malicious software, often provides unauthorized access to a personal or company's computing device and can lead to many negative outcomes, from identity theft to a viral attack on a company's infrastructure. In general, malware is any software used to disrupt computer operations, gather sensitive information, gain access to private computer systems, or display unwanted advertising. Malware may be downloaded to a user's computer through a public network, such as the Internet, and attach to existing executable content on a user's computer. Once installed or executed on the user's computer, the malware may obtain information from the user's computer and/or gain control over some or all of the computer's functions.

In many instances, malware is designed to steal information or spy on computer users for an extended period without their knowledge, or it may be designed to cause harm, often as sabotage or to extort payment. As used herein, "malware" may refer to a variety of forms of hostile or intrusive software applications inadvertently obtained from a public network, including viruses, worms, Trojan horses, ransomware, spyware, adware, and other malicious programs. Typically, such malware is included embedded in programs downloadable from websites that appear useful to the users. However, when executed on the user's computer, the programs include the additional hidden tracking functionality that gathers information from the user's computer and provides such information to a third party over a network.

Software such as anti-virus programs, anti-malware programs, and firewall programs or devices is used to try and protect a user's computer against activity identified as malicious, and to recover from attacks. However, for such programs and devices to work, the source, type, or signature of the malware is typically known prior to the user's computer accessing the malware. In other words, the preventative programs and devices know what to monitor for while a user accesses the public network to block the malware from being downloaded to the user's computer. Building up a database of known malware programs or signatures of malware takes time and processing power to accomplish and may, in some instances, require a user to experience the effects of the malware program before the identification of the program is known by the anti-virus program.

Many anti-virus systems attempt to detect malware programs through emulated Internet browsers or sandbox programs that allow the malware to be downloaded and explored without infecting a user's computer or connected network. However, malware is often designed to detect when it is executed in an emulated browser or sandbox environment and cease working or be deleted. In this manner, malware attempts to protect itself from detection when executed in a safe environment so that the malware may not be detected for use in mitigation techniques. Sophisticated malware programs may also monitor and detect interactions with the browser, such as inputs received in the browser from an input device and a browser history file indicating previous websites visited through the browser, to further determine whether the malware is being executed in an emulated environment.

SUMMARY

One implementation of the present disclosure may take the form of a method for managing access to a public network. The method may include the operations of utilizing a control system to control a computing device to access an initial node in the public network and applying a personality profile to the computing device to access a second node in the public network, with the personality profile comprising a plurality of inputs provided to the computing device to control a browser program displayed on a display of the computing device. The method may further include the operations of analyzing transmission of information between the computing device and the public network during accessing of the second node of the public network, detecting an indication of a malware program stored in the public network accessible through the second node, and storing information of the malware program in a database based on the analyzed transmission of information between the computing device and the public network during accessing of the second node of the public network. Another implementation of the present disclosure may take the form of a non-transitory computer-readable medium encoded with instructions for detecting malware in a public network. The instructions, when executed by a processor, perform one or more of the operations described above.

Another implementation of the present disclosure may take the form of a malware detection system. The system may include at least one computing device in communication with a public network and a control device in communication with the at least one computing device. The control device may include a processing device and a computer-readable medium connected to the processing device configured to store information and instructions that, when executed by the processing device, performs certain operations. Such operations may include instructing a browser program executed by the computing device to access an initial node in the public network and applying a personality profile to the computing device to access a second node in the public network, the personality profile comprising a plurality of inputs provided to the computing device to control the browser program. The operations may also include analyzing an exchange of information between the computing device and the public network during accessing of the second node of the public network, detecting an indication of a malware program stored in the public network accessible through the second node, and storing information of the malware program in a storage device based on the analyzed transmission of information between the computing device and the public network during accessing of the second node of the public network.

DETAILED DESCRIPTION

Figure 1:
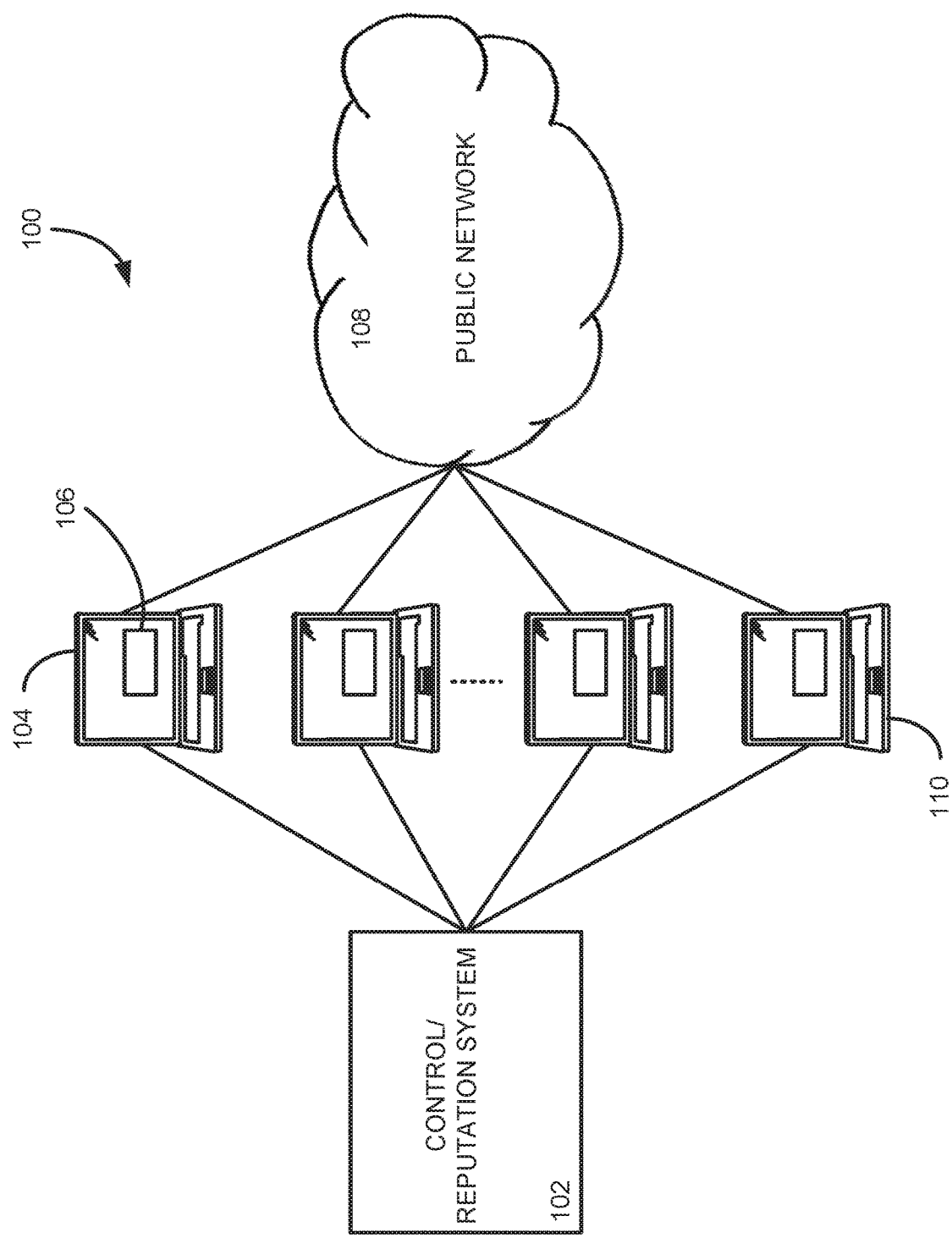
FIG. 1 is an example computing environment for detecting and storing information concerning malware or other harmful software obtained over a public network.

Aspects of the present disclosure involve systems, methods, computer program products, and the like, for utilizing one or more computing devices to access a public network posing as a user to the network to detect one or more malware programs available for downloading through the network. More particularly, a malware detection control system utilizes a browser executed on a computing device to access a public network, such as the Internet. Through the browser, sites or nodes of the public network are accessed by the control system with the interactions with the sites of the public network designed to mimic or approximate a human user of the browser. For example, a personality profile may be created by the malware detection control system that mimics a particular human user of a computing device, including input techniques (typing speed on a keyboard, a particular keyboard language used, mouse pointer control, scrolling speed, etc.) public network interaction history (such as previously visited websites and searches conducted), and/or pauses in-between interactions with the sites to allow the human user to obtain information from the sites. Different profiles may be created to mimic or approximate interests of the particular human users, including particular sites visited that align with the interests of the profiled user. For example, the control system may select sites to visit and links to other sites based on a determined "interest" of the profiled user. In this manner, the control system mimics or approximates a human user of the browser to counter bot detection techniques of malware programs.

Once one or more personality profiles of particular users are created, the control system may utilize the browser of the computing device to access the public network. More particularly, the control system may apply the one or more personality profiles to the browser of the computing device to access and interact with the nodes of the public network. In this manner, malware programs on the public network may monitor the interactions with the nodes of the network and may not be aware of the control of the browser by the control system. Further, the control system may monitor the information retrieved from the network sites to detect the presence of malware within the nodes. In one embodiment, the control system may be configured to access known or suspected sites or links where malware has a higher likelihood of residing. Further, many such computing devices and browsers may be controlled by the control system to scan the network for possible malware programs. Detected or suspected malware programs may then be executed within the browser or computing device and analyzed to determine how the malware works, the malicious outcome of the executed malware, and possible mitigation techniques to combat the malware. This information may also be stored by the control system and provided to virus-prevention programs and/or firewall devices to prevent the detected malware from being experienced by real-world users of the network. Thus, through the control system, potential malware programs may be detected and utilized to prevent future infection of a user's computing device.

FIG. 1 is an example computing environment 100 for detecting and storing information concerning malware or other harmful software obtained over a public network. Through the environment 100, one or more malware programs residing or otherwise available through a public network may be detected and information about the malware programs may be stored. This information may then be utilized by malware-prevention techniques and/or devices to prevent the access of the malware by computing devices of users of the network.

The environment 100 includes a control/reputation system 102 for controlling any number of computing devices 104. In particular, each computing device 104 may include a browser program 106 that the control system 102 utilizes to access a public network 108. In one particular embodiment, the public network 108 is the Internet. Each browser 106 operating or executing on the respective computing device 104 provides an interface through which sites or nodes of the public network 108 are accessible. During accessing of the sites, information is requested from the sites and provided to the computing device 104. Thus, each computing device 104 may be in communication with the public network 108 through any type of connection, such as a wireless connection or a wired connection. A request for the content of the site of the public network 108 is transmitted along the connection from the computing device 104 to the public network, at which time the network transmits the requested information to the browser program 106 of the requesting computing device. Those of ordinary skill in the art will be aware of the types of communication sessions and information transmitted between the computing device 104 and the Internet to cause the browser 106 to render the requested information on the computing device's display.

In one particular embodiment, one or more of the computing devices 104 connect to the public network 108 through a telecommunications network. In general, the telecommunications network provides for establishing communication sessions between network users and for providing one or more network services to network users. For example, users to the network may communicate with each other through communication devices, including voice communications and video communications. The telecommunications network includes numerous components such as, but not limited to gateways, routers, and registrars, which enable communication and/or provides services across the network. The connecting network may include one or more long distance networks, one or more content delivery network (CDN), one or more border networks (such as an Internet Service Provider (ISP)) or any other type of telecommunications networks.

Returning to FIG. 1, the control system 102 may control and operate the computing devices 104 through a wireless or wired connection to the computer devices to direct the devices to access the public network 108. In general, the control system 102 provides instructions or commands to the computing device to execute the browser 106 within the computing device to access the public network 108. The control system 102 may also provide instructions to manipulate aspects of the browser 106 to access different sites or nodes within the public network 108. For example, the control system 102 may provide an input instruction to the computing device 102/browser 106 to select a link contained within the hypertext machine language (HTML) code of a site of the public network 108 to request information from and access a site within the network. Other input instructions, such as mouse point movements, scrolling through a website, and typing into text boxes within the website may also be provided and controlled by the control system 102 and into the browser program 106.

In some instances, the computing device 104 may be a personal computing device, such as a laptop or desktop. In other instances, the computing device 104 may be a mobile or wireless device, such as a smartphone or tablet. In general, any known or hereafter developed computing device with a browser program may be controlled by the control system 102 to access the public network 108 to obtain information of the sites or nodes of the network.

Figure 2:
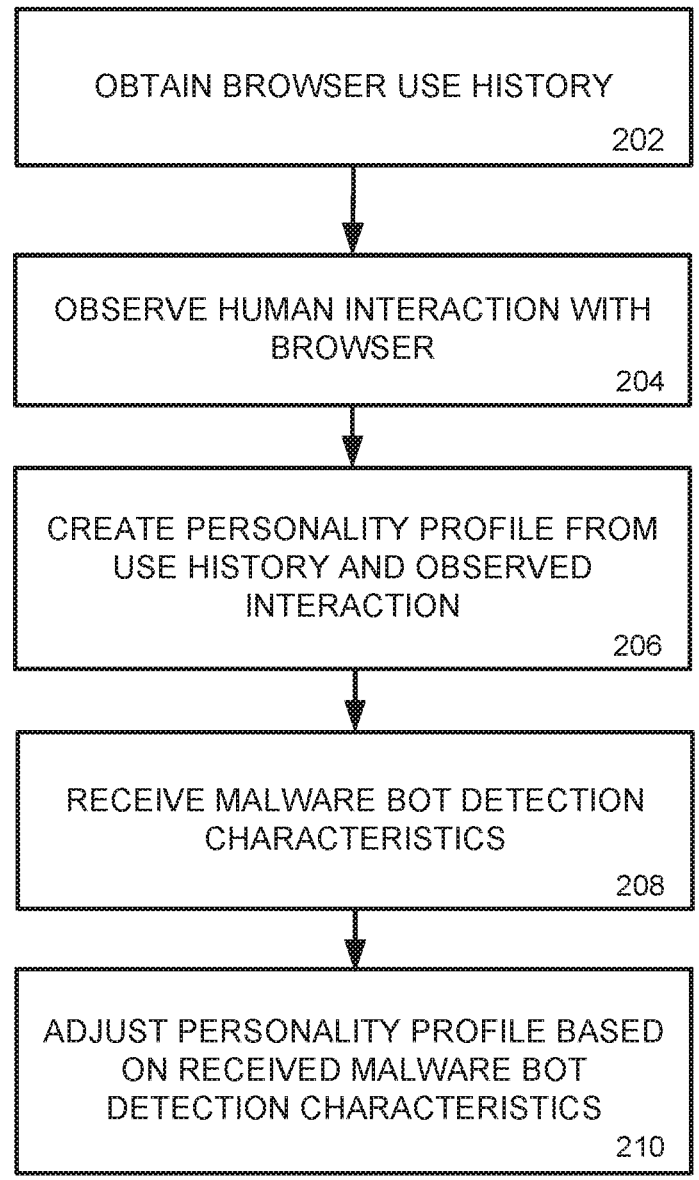
FIG. 2 is a flowchart of an example method for creating a computerized user of a public network to detect and obtain malware or other harmful software from a public network.

As mentioned above, the control system 102 may interact with the browser 106 of the computing device 104 by utilizing a personality profile that mimics or approximates a human user of the browser. More particularly, the personality profile may provide guidelines or instructions for the control system 102 to manipulate or control the browser 106 of the computing device 104. By utilizing or otherwise applying the personality profile, the control system's control of the browser 106 of the computing device 104 may appear as being controlled by a live person. FIG. 2 is a flowchart of an example method 200 for creating a computerized user of a public network to detect and obtain malware or other harmful software from a public network. In general, the operations of the method 200 of FIG. 2 are performed by the control system 102 of the system 100 discussed above. However, one or more of the operations of the method 200 may be performed by any networking or computing device of the system 100.

In general, the method 200 of FIG. 2 is performed to create or obtain a personality profile for use during access of the public network 108 to detect the presence or location of malware within the network. Beginning in operation 202, the control system 102 obtains a browser history of a particular user of the browser that is to be emulated. For example, a human operator of a computing device 104 that is to form part of the personality profile may utilize the browser 106 to access the public network 108. The websites or nodes accessed by the browser 106 during this period may be stored at the computing device 104 as a browser history. More particularly, the operator may visit particular sites in which the user is interested. For example, the user may be a sports fan and may visit websites that provide information about sporting events. In another example, the user may utilize the public network 108 to conduct research into a particular area of study. In this manner, the sites visited provide an indication of a personality of the operator and particular websites or network nodes that are of particular interest to the subject of the personality profile. In other words, the browser history of the user provides an indication of a human user's interests around which a personality profile may be constructed by the control system 102. As explained in more detail below, the control system 102 may then utilize this browser history information to emulate a human operator of a browser 106 to disguise that the control of the browser is from a system and not a human when searching for malware within the public network 108.

In operation 204, the control system 102 may also observe particular interactions the operator has with the browser and the public network. In addition to obtaining the visited websites, the control system 102 may monitor the inputs provided to the browser 106 by the human operator. Such inputs may include the movements of an icon input through a mouse input device, the amount of time the user stays on a particular website, the scrolling activity of the user to access additional parts of the website, links the user selects within a webpage, the type of keyboard/language used, and any other input provided to the browser 106 from the user of the computing device 104.

With the user visited websites and received inputs, the control system 102 may create a personality profile that is then utilized to access the public network 108 through the computing device 104 in operation 206. For example, the control system 102 may open a browser 106 of the computing device 104 and load the website history or other use history into a proper file associated with the browser. This may prevent a malware program, when encountered in the public network 108, from accessing the browser history and detecting that the user is a control system and not a human user. Further, the inputs provided to the browser 106 may be emulated by the control system 102 through one or more control instructions provided to the computer device 104/browser 106 while accessing the public network 108. For example, the control system 102 may access a first website. Depending on the information provided through the website, the control system 102 may provide the control instructions to control the interactions with the browser 106 while accessing a website, including mouse movements, scrolling movements, length of viewing the webpage, selecting embedded links, etc. Different personality profiles may have different use parameters such that no two personality profiles are exactly alike. This may further disguise the use of the control system 102 controlling the computing device 104 to access the public network 108 from such malware that may be monitoring the particular inputs provided to the browser 106. Further, the control system 102 may utilize different personality profiles at different computing devices accessing the network 108. For example, computing device 104 of FIG. 1 may have a first personality profile applied for accessing the network (such as a personality profile of a sports fan), while computing device 110 may have a different personality profile from the first personality profile used (such as a researcher). In general, the control system 102 may utilize any number of personality profiles and computing devices to access the public network 108 in search of malware within the public network 108.

As mentioned above, malware developers are particularly interested in detecting when a malware program is being executed in a controlled or sandbox environment so that the program can cease operating when such an environment is detected. Thus, malware developers are continually developing better techniques to detect when the user is a bot or the browser environment is a sandbox environment. To address the improvement of environment detection techniques, the method 200 of FIG. 2 may continue to adjust the parameters of the personality profiles applied when accessing the network 108. For example in operation 208, the control system 102 may receive malware bot detection characteristics. As described, malware may attempt to determine when the malware is executed in a sandbox or emulated environment or browser. To detect the sandbox environment, the malware may perform certain operations, such as accessing a browser history and/or monitor inputs received at the browser from an input device. These operations may be detected at the computing device 106 by the control system 102 through an analysis of the code or information requests received at the computing device by the executing malware. Through the received requests or executed code, the control system 102 may determine that a malware program on the public network 108 is attempting to monitor the inputs provided to the browser 106.

In addition, as more and more sophisticated sandbox environment detection techniques are created, the control system 102 may detect these additional techniques based on an analysis of the malware code and operations. Further, in operation 210, the control system 102 may develop additional obfuscation techniques or adjust one or more personality profiles in response to the received malware bot detection characteristics. In other words, as additional environment techniques are discovered, the control system 102 may adjust the operation of the browser 106 of the computing device 104 to further hide the control of the browser by the control system by counteracting the detection techniques. In this manner, the operation of the browser 106 by the control system 102 may appear to the malware as a human operator such that the malware may continue to operate within the browser 106 or computing device 104 for observation by the control system.

Figure 3:
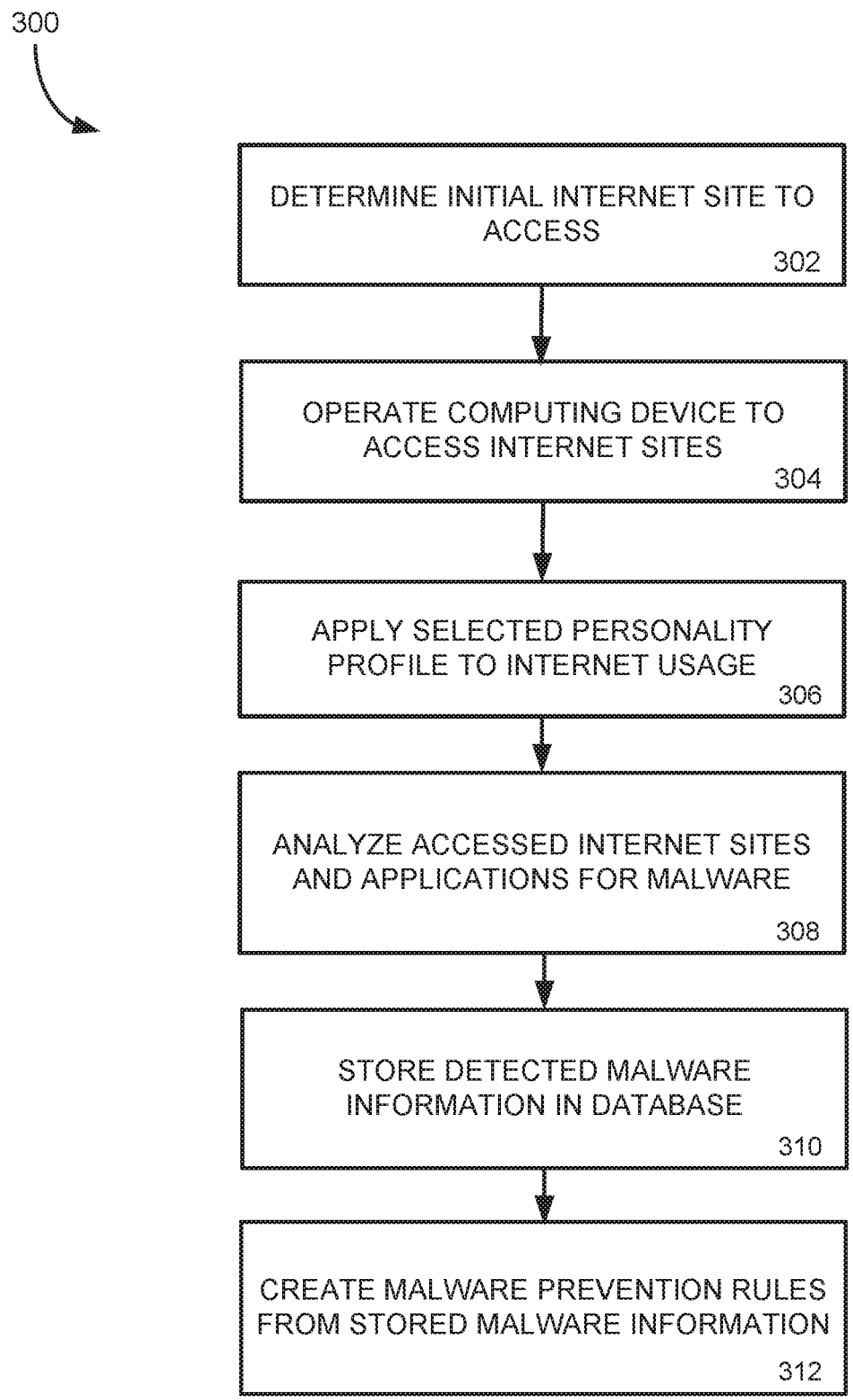
FIG. 3 is a flowchart of an example method for utilizing a computer device to detect and obtain malware or other harmful software from a public network.

With the one or more personality profiles created, the control system 102 may utilize the computing device 104 and browser 106 to access the public network 108 to search for and obtain malware programs available on the public network. In particular, FIG. 3 is a flowchart of an example method 300 for utilizing a computer device 104 to detect and obtain malware or other harmful software from a public network 108. In one embodiment, the operations of the method 300 of FIG. 3 may be performed by the control system 102 of FIG. 1 to obtain information about a malware program of the public network 108. In other embodiments, one or more of the operations may be performed by any type of computing or networking device.

Beginning in operation 302, the control system 102 determines an initial website or node of the public network 108 to access through the browser 106 of the computing device 104. In one embodiment, the initial website may be based on the personality profile utilized by the control system 102. For example, the initial website may be a sports-related website if the personality profile utilized by the control system 102 is designed or configured to emulate a sports fan. In another embodiment, the initial website may be a popular website as determined by the control system 102. For example, the control system 102 may access a node of the public network 108 that provides an indication of a currently popular website or topic, such as news websites about a current or recently occurred event or websites devoted to an upcoming holiday. Several aggregation websites are available on the Internet that collect and list the most popular websites at any one time or over a period of time. Through these aggregation websites, a popular website may be selected as the initial website the control system 102 accesses to begin the interaction with the public network 108. This may be selected as the initial website by the control system 102 as malware producers may also use similar popularity aggregation websites to determine where most users of the Internet may visit and attempt to introduce their malware program into those popular websites to increase the proliferation of the malware through users of the public network.

Once the initial website or node is selected, the control system 102 may operate the computing device 104 (and more particularly, the browser 106 of the computing device) to access the initial website or node in operation 304. This may be accomplished by providing the website uniform resource locator (URL) or other address into the browser to navigate to the initial website. Once the website is loaded into the browser 106, the control system 102 may apply the selected personality profile to the usage of the website in operation 306. More particularly, the control system 102 may provide inputs to the browser based on the personality profile, such as by pausing for a particular amount of time between inputs, controlling the scrolling through the website, moving the mouse pointer within the browser around the various components of the website, and the like. These inputs provided to the browser 106 may be based on the selected personality profile such that the inputs may vary from profile to profile and are designed to emulate a human user of the browser 106 or computing device 104.

Concurrently with the application of the personality profile, the control system 102 may also analyze the accessed websites for malware programs in operation 308. In general, the browser 106 provides an address or URL to the public network 108 to access a website. In return, the network 108 provides information or data to the browser 106 that instructs the browser to render the website. Such information may include HTTP code or other software instructions. The browser executes the received information or instructions and renders the website on the display device associated with the computing device 104. Thus, the control system 102 or the computing device 104 may include a program or other mechanism through which the instructions received from the network 108 to render the website may be obtained and analyzed during transmission of the instructions to the computing device 104. For example, the website may include one or more javascript instructions to render video or audio within the website. Malware programs may be embedded within such javascript instructions that are then downloaded to the computing device 104 and executed by the browser 106 that infect the computing device as described above. The computing device 104 or control system 102 may be configured to analyze the received instructions (such as the javascript used by the website) to detect the presence of a malware program included in the instructions.

In many instances, the malware instructs the infected computing device 104 to download the malware program without the knowledge of the user of the browser 106. However, because the control system 102 or the computing device 104 monitors the transmission of information to and from the public network 108, instructions to download or the actual downloading of the malware program may be detected and tracked. Further, the control system 102 may utilize a database of known malware signatures to determine when malware of the public network 108 is encountered. For example, a particular line of code or instructions that cause the computing device 104 to download a program from the network 108 may be known as a malware program instruction. Thus, when the instruction is detected at the computing device 104, the control system 102 may determine that a malware program is encountered. In this manner, the interactions between the computing device 104 and the network 108 may create a signature that leads to the infection of the computing device. Other types of signatures may include suspicious executable files provided through the website or instructions for the computing device to access known malicious or suspicious IP addresses within the network 108 from which malware programs are known to originate.

As new malware programs are detected within the public network 108, information concerning the malware programs and/or the sites through which the malware programs are encountered may be stored in a database by the control system 102 in operation 310. As described, the information stored may be used by the control system 102 (or other control systems) to aid in detecting more information about the malware programs on the network 108. Further, the information may be provided to other malware prevention devices or programs to inform those devices of the detected malware program to prevent other computing devices from being infected. In still other embodiments, the control system 102 may analyze the detected malware program and create one or more prevention rules to prevent further infection of computing devices in operation 312. For example, the malware program may be associated with a particular IP address within the network 108. When the malware program is detected, the IP address used to obtain the malware may be flagged as a source of malware programs. This IP address may then be shared with other prevention devices (such as firewalls) to prevent the malware program from spreading. In another example, certain vulnerabilities within programs utilized by the browser 106 may be exploited by the malware to gain access to the computing device 104. Through an analysis of the malware program, the vulnerabilities in the programs may be determined and a patch may be created that fixes the vulnerabilities to prevent further infection by the malware. Through these operations, the control system 102 may utilize the computing device 104 to access the public network 108 to detect malware and create one or more prevention techniques to prevent further spread of the detected malware to other computing device.

In an additional embodiment, the control system 102 may create and store one or more documents on the computing device 104 designed to attract a malware program to access the documents. For example, the control system 102 may create one or more documents that include keywords or titles of which a malware program may access, such as the keyword "password" or "bank account number". Further, the created documents may include a reporting code, such as a webbug, that reports a piece of data back to a server when the document is accessed and opened. For example, the webbug may provide an IP address or approximate location of an accessing device. In this manner, the document lures in a malware program to obtain the document and provide the document to an attacking device. The attacking device may, upon retrieving the document, open the document to procure the information stored therein. However, upon opening the document, a piece of identifying information may be reported or otherwise transmitted to a server that indicates the document was maliciously obtained and opened.

In one particular embodiment, the documents and the luring keywords of the documents may be based on the personality profile for that particular computing device. In other words, the keyword and/or a file type may be based at least on the personality profile of the human user associate with the computing device. For example, a personality profile of a generated user may indicate that the user accesses a particular online banking application. A luring document may thus be created that includes the bank name or other banking information in the title or keywords of the document. This may alert a malware program to retrieve the document, while also suggesting to the malware program that the document is an actual document created by the personality profile. In other words, similar to the analysis of the browser history that hides the control of the computing device 104 by the control system 106, the parameters of the luring document stored on the computing device may be based on one or more aspects of the personality profile associated with the computing device. This may further aid the computing device in identifying a source of a malware program to take steps in preventing further downloading of the malware.

The above operations may be performed by the control system 102 many times as the system navigates through the public network 108. For example, the control system 102 may operate the computing device 104 to access the initial website or node. After applying the personality profile to the use of the initial website, the control system 102 may click on a link within the initial website to access a second website. During the transfer of information between the network 108 and the computing device 104 when accessing any website within the network, the information may be obtained and analyzed by the control system 104 to detect the occurrence of a malware program. At the second website, an additional link to another website may be selected and the process may repeat. For example, the control system 102 may select an advertisement within a website to access another website, all while monitoring the exchange of information. In this manner, the control system 102 may control the computing device 104 to access several or hundreds of websites within the network to crawl through the network searching for malware. Further, the activities of the control system 102 may appear to any such encountered malware as being from a human user such that the malware may execute fully within the computing device 104. The activities of the malware may then be analyzed and/or stored to develop prevention techniques against the encountered malware, all within a controlled computing environment.

Figure 4:
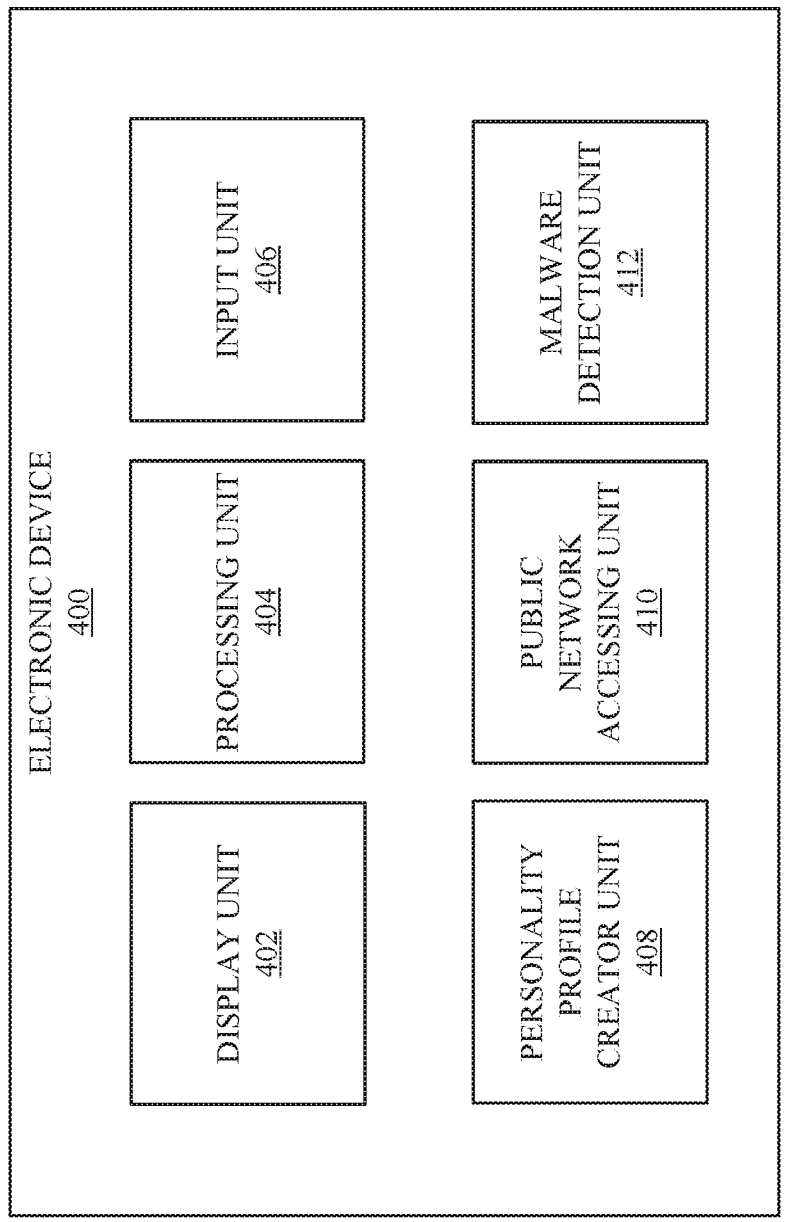
FIG. 4 is a functional block diagram of an example electronic device including operational units arranged to perform various operations of the presently disclosed technology.

Turning to FIG. 4, an example electronic device 400 including operational units 402-412 arranged to perform various operations of the presently disclosed technology is shown. The operational units 402-412 of the device 400 are implemented by hardware or a combination of hardware and software to carry out the principles of the present disclosure. It will be understood by persons of skill in the art that the operational units 402-412 described in FIG. 4 may be combined or separated into sub-blocks to implement the principles of the present disclosure. Therefore, the description herein supports any possible combination or separation or further definition of the operational units 402-412.

In one implementation, the electronic device 400 includes a display unit 402 configured to display information, such as a graphical user interface, and a processing unit 404 in communication with the display unit 402 and an input unit 406 configured to receive data from one or more input devices or systems. Various operations described herein may be implemented by the processing unit 404 using data received by the input unit 406 to output information for display using the display unit 402.

Additionally, in one implementation, the electronic device 400 includes units implementing the operations described with respect to FIG. 4. For example, one or more operations of the method 200 of FIG. 2 may be implemented by a personality profile unit 408 of the electronic device. Further, the electronic device 400 may include a public network accessing unit 410 configured to control a computing device to access a public network, such as the Internet. In a similar manner, a malware detection unit 412 may analyze information and/or instructions received from the public network to determine the presence or encounter of a malware program within the public network. The malware detection unit 412 may also store information about the detected malware program in a database associated with the electronic device 400.

Figure 5:
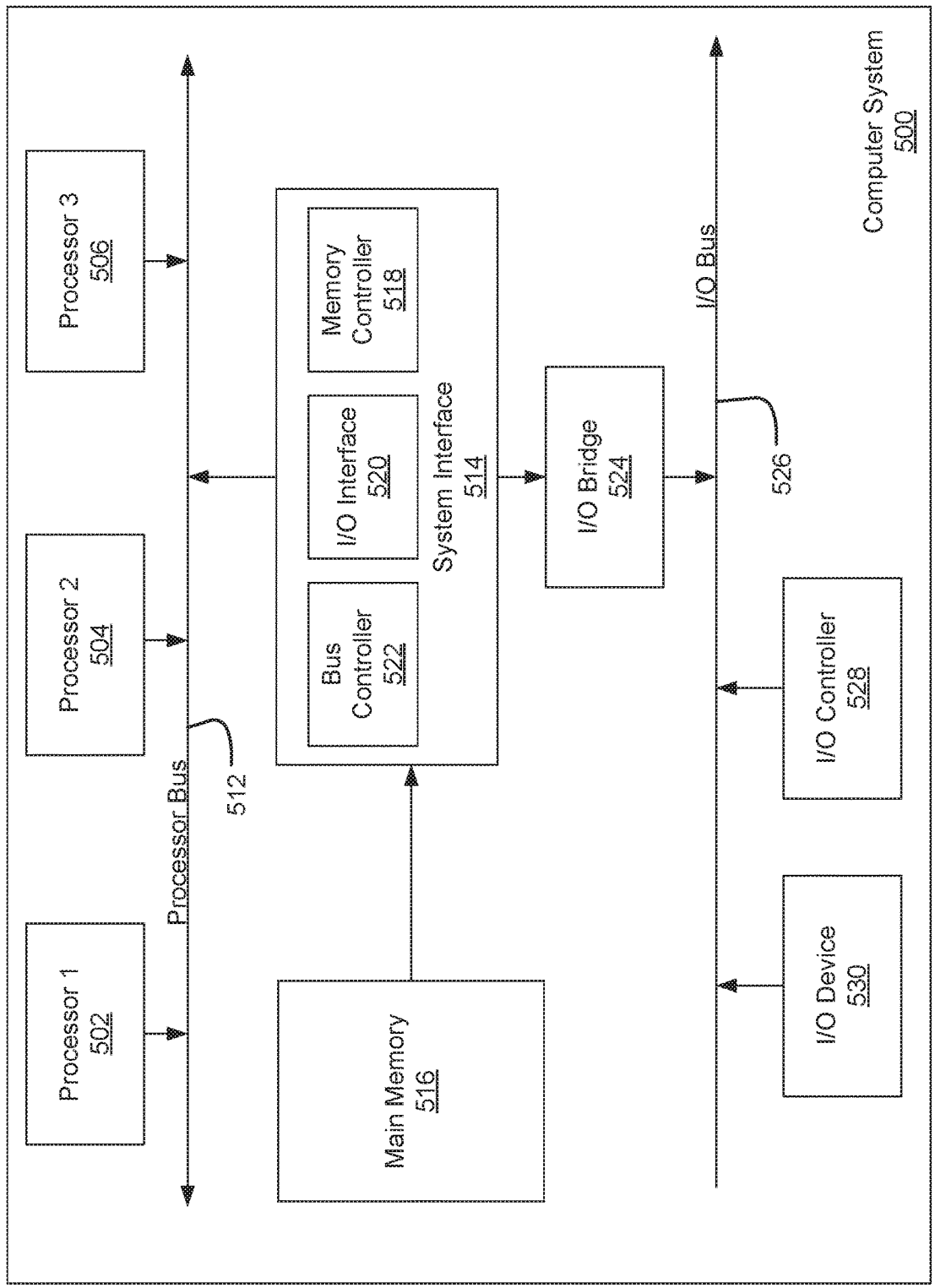
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the systems disclosed above. In particular, the computing device of FIG. 5 is one embodiment of the control system 102 that performs one of more of the operations described above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for managing access to a public network, the method comprising:
utilizing a control system to control a computing device to access a first node in the public network;
applying a personality profile to the computing device to access a second node in the public network, the personality profile comprising a plurality of inputs provided to the computing device to control a browser program displayed on a display of the computing device;
analyzing transmission of information between the computing device and the public network during accessing of the second node of the public network;
detecting an indication of a malware program stored in the public network accessible through the second node;
storing information of the malware program in a database based on the analyzed transmission of information between the computing device and the public network during accessing of the second node of the public network; and
creating malware prevention rules based on the information of the malware program.

2. The method of claim 1, wherein creating malware prevention rules based on the stored information comprises flagging a network address associated with the information of the malware program as a source of malware programs.

3. The method of claim 2, wherein creating malware prevention rules based on the stored information further comprises:

preventing the malware program from spreading by sharing the flagged network address with another computing device.

4. The method of claim 1, further comprising obtaining a use history of the browser program of the computing device, wherein the personality profile comprises the use history of the browser program.

5. The method of claim 4, wherein applying the personality profile to the computing device to access the second node in the public network comprises transmitting the use history and the plurality of inputs to the browser program of the computing device.

6. The method of claim 1, further comprising adjusting the personality profile based at least on the analyzed transmission of information between the computing device and the public network during accessing of the second node of the public network.

7. The method of claim 1, wherein the plurality of inputs to the browser program of the computing device comprise at least one of a mouse movement, a scrolling input, a length of viewing of the first node in the public network, or a selected embedded link with in the first node.

8. The method of claim 1, further comprising accessing an aggregation service of the public network to determine the first node accessed by the computing device.

9. A malware detection system comprising:
a computing device in communication with a public network; and
a control device in communication with the computing device, the control device comprising:
a hardware processing device; and
a computer-readable medium connected to the processing device configured to store information and instructions that, when executed by the processing device, performs the operations of:
instruct a browser program executed by the computing device to access a first node in the public network;
apply a personality profile to the computing device to access a second node in the public network, the personality profile comprising a plurality of inputs provided to the computing device to control the browser program;
analyze an exchange of information between the computing device and the public network during accessing of the second node of the public network;
detect an indication of a malware program stored in the public network accessible through the second node;
store information of the malware program in a storage device based on the analyzed transmission of information between the computing device and the public network during accessing of the second node of the public network; and
create malware prevention rules based on the information of the malware program.

10. The system of claim 9, wherein creation of the malware prevention rules based on the stored information comprises flagging a network address associated with the information of the malware program as a source of malware programs.

11. The system of claim 10, wherein creation of the malware prevention rules based on the stored information further comprises preventing the malware program from spreading by sharing the flagged network address with another computing device.

12. The system of claim 9, wherein the processing device of the control device further performs the operation of obtain a use history of the browser program of the computing device, wherein the personality profile comprises the use history of the browser program.

13. The system of claim 12, wherein to apply the personality profile to the computing device to access the second node in the public network comprises transmitting the use history and the plurality of inputs to the browser program of the computing device.

14. The system of claim 9, wherein the processing device of the control device further performs the operation to adjust the personality profile based at least on the analyzed transmission of information between the computing device and the public network during accessing of the second node of the public network.

15. The system of claim 9, wherein the plurality of inputs to the browser program of the computing device comprise at least one of a mouse movement, a scrolling input, a length of viewing of the first node in the public network, or a selected embedded link within the first node.

16. The system of claim 9, wherein the processing device of the control device further performs the operation to access an aggregation service of the public network to determine the first node accessed by the computing device.

17. A non-transitory computer-readable medium encoded with instructions for detecting malware in a public network, the instructions, executable by a processor, comprising:
utilize a control system to control a computing device to access a first node in the public network;
apply a personality profile to the computing device to access a second node in the public network, the personality profile comprising a plurality of inputs provided to the computing device to control a browser program displayed on a display of the computing device;
analyze transmission of information between the computing device and the public network during accessing of the second node of the public network;
detect an indication of a malware program stored in the public network accessible through the second node;
store information of the malware program in a database based on the analyzed transmission of information between the computing device and the public network during accessing of the second node of the public network; and
create malware prevention rules based on the information of the malware program.

18. The non-transitory computer-readable medium of claim 17, wherein creation of the malware prevention rules based on the stored information comprises flagging a network address associated with the information of the malware program as a source of malware programs.

19. The non-transitory computer-readable medium of claim 18, wherein creation of the malware prevention rules based on the stored information further comprises preventing the malware program from spreading by sharing the flagged network address with another computing device.

20. The non-transitory computer-readable medium of claim 17, wherein the instructions further comprise:
obtain a use history of the browser program of the computing device, wherein the personality profile comprises the use history of the browser program; and
adjust the personality profile based at least on the analyzed transmission of information between the computing device and the public network during accessing of the second node of the public network.

* * * * *